United States Patent
von Levern et al.

(10) Patent No.: US 6,886,676 B2
(45) Date of Patent: May 3, 2005

(54) HUB RING, COVER PLATE AND CLUTCH DISK

(75) Inventors: Frank von Levern, Kürnach (DE); Norbert Lohaus, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/462,484

(22) Filed: Jun. 16, 2003

(65) Prior Publication Data

US 2003/0234152 A1 Dec. 25, 2003

(30) Foreign Application Priority Data

Jun. 22, 2002  (DE) .......................................... 102 27 971

(51) Int. Cl.$^7$ .............................................. F16D 13/64
(52) U.S. Cl. ................ 192/213.12; 192/212; 192/70.17
(58) Field of Search ................... 192/70.17, 212–214.1; 464/68

(56) References Cited

U.S. PATENT DOCUMENTS

| 2,521,138 | A | * | 9/1950 | Waller .......................... 464/68 |
| 4,006,809 | A | * | 2/1977 | Seino et al. .............. 192/113.5 |
| 4,603,767 | A | * | 8/1986 | Blond .................... 192/213.12 |
| 4,813,523 | A | * | 3/1989 | Adachi .................. 192/213.22 |
| 4,966,269 | A | * | 10/1990 | Raab et al. .............. 192/70.16 |
| 6,299,540 | B1 | * | 10/2001 | Ament ......................... 464/68 |

FOREIGN PATENT DOCUMENTS

JP         56047503 A  *  4/1981   ............. B22F/3/24

* cited by examiner

Primary Examiner—Richard M. Lorence
(74) Attorney, Agent, or Firm—Cohen, Pontani, Lieberman & Pavane (57) ABSTRACT

A hub ring for use in a clutch disk includes an inner circumference which can engage a hub; and a pair of axially opposed front sides. At least one of the front sides has means for positively engaging a structural component arranged against the respective front side so that torque can be transmitted from the structural component to the hub.

24 Claims, 8 Drawing Sheets

ND COVER PLATE AND CLUTCH
HUB RING, COVER PLATE AND CLUTCH DISK

BACKGROUND OF THE INVENTION

1. Field of the Invention

The present invention relates to a hub ring having positive engagement, such as toothings that engages a clutch cover to at least partially transmit a torque.

2. Description of the Related Art

As a rule, clutch disks are constructed in such a way that a hub ring fits on a hub by which the torque can be transmitted from the hub ring to the input shaft of the transmission.

The drivetrain provided in a vehicle generates torsional vibrations which can lead to undesirable secondary effects such as chattering, buzzing, or drumming noises. Therefore, particularly in the automotive industry, clutch disks include torsional vibration dampers that prevent these unwanted side effects and to enable smooth starting. Further, predampers have been incorporated in clutch disks. These predampers serve, among other things, as an idling system.

Particularly in clutch disks with predampers, a hub ring fits on a hub which is rotatable relative to the hub ring by a certain angle, the so-called predamper angle. The toothing provided at the inner circumference of the hub ring serves as a stop for the predamper. After the predamper angle is exceeded, this internal toothing serves to transmit the torque from the hub ring to the hub of the input shaft of the transmission. Cover plates which serve to receive the pressure springs of the main torsional vibration damper are arranged at the upper side and lower side of the hub ring. The connection between the hub ring and the cover plates is generally produced by rivets that are guided in bore holes extending through the thickness of the hub ring and through the thickness of the cover plate. The rivets not only fasten the cover plate to the hub ring, but also transfer the torque from the cover plates to the hub ring. In general, the total flow of force in the clutch disk is such that the engine torque is transferred to the cover plate, hub ring and, finally, to the hub and transmission shaft via clutch disk linings, a driver disk and the torsional vibration damper.

The total transfer of torque between the hub and pressure springs of the torsional vibration damper is accordingly carried out in such clutch disks using the rivets which are guided through the cover plate and the hub ring.

This high load requires that a certain number of rivets and a certain diameter of the rivets must be used to prevent the rivets from shearing off. Further, in order to preserve the stability of the hub ring itself, the hub rings must be produced from a material of high strength. As a rule, forged parts are used for this purpose. Further, by providing bore holes suitably sized to receive the rivets, the hub ring is weakened at the hole location. This weakening is countered by reinforcement or strengthening in the direction of the center of the hub ring. This strengthening serves at the same time as an internal toothing for engaging with the external toothing of the hub. Since the number of teeth of the internal toothing of the hub ring is determined by the number of rivets needed to avert shearing, the predamper angle, that is, the play between the internal toothing of the hub ring and the external toothing of the hub, is limited.

SUMMARY OF THE INVENTION

Thus, it is an object of the present invention to provide a hub ring, a cover plate and a clutch disk having a flexible design of the hub ring that is produced economically but can also dependably withstand occurring loads.

This and other objects are met in that the transfer of torque between the hub ring and the cover plate is carried out substantially via the contact surface between the hub ring and cover plate.

Therefore, in one embodiment, a hub ring for use in a clutch disk which has an inner circumference is used to engage a hub. On at least a partial area of the upper or lower side of the hub ring, the hub ring has means for a positive engagement. With this means the hub ring can be connected to a structural component to be arranged on the front side for transmitting torque.

This hub ring has the advantage that the means for the transmission of torque need not pass through the ring itself. Therefore, the number and size of the connection rivets can be reduced because they are used at most for holding and positioning and for receiving axial forces which may occur, but do not serve to transmit torque. Therefore, the hub ring is weakened to a lesser extent. Thus, extra ring depth, generally formed as an internal toothing in conventional hub rings at the interior, and here acting as reinforcement may also be dispensed with at least in part. The internal toothing can accordingly be designed for engaging with the hub based on other criteria such as, e.g., the desired predamping angle. In addition to the reduction in the quantity of rivets and, therefore, in the quantity of bore holes, the diameter of the bore holes for receiving the rivets can also be reduced. This creates more space for a user-specific design of the hub ring.

The structural component that is arranged on the hub ring on at least one side is generally a cover plate which receives the torsion springs of a torsional vibration damper.

Particularly when a mechanical component such as a cover plate is arranged at both sides of the hub ring, that is, at the upper side and lower side, the means for positive engagement can be provided at both corresponding upper and lower sides of the hub ring.

In one embodiment, a toothing serves a means for the positive engagement. For example, this toothing may be a Hirth serration for a positively-engaging, self-centering connection. The torque is transmitted via the individual teeth at the structural component part, such as the cover plate, and from the cover plate to the hub ring by means of a toothing on at least one area of the upper or lower side of the hub ring. Therefore, the number of points of torque transmit is generally increased compared to conventional clutch disks in which the torque transmit is carried out via a certain number of rivets. Therefore, loads are lower at the individual points and can be taken over by the teeth of a toothing without the risk of the teeth breaking. Further, the maximum torque that can be transmitted, can be increased by providing a toothing at the upper or lower side of the hub ring.

The means preferably extend over the entire surface of the respective upper or lower side of the hub ring. Accordingly, when a toothing is used, the entire upper or lower side is provided with teeth which preferably extend in a radial direction. Accordingly, a large portion of the total surface of the hub ring is used for the transmission of torque, which reduces the risk of load peaks at individual points.

However, in one embodiment, the partial area in which means for the positive engagement are provided only extends over the outer area of the surface of the respective front side from the outer circumference of the hub ring in the direction of the inner circumference of the hub ring. This partial area can extend up to the center of the front side, for example. This embodiment form is important, particularly, when a Hirth serration is used as means for the positive engagement. However, it is also possible for the partial areas in which means for the positive engagement are provided to be arranged so as to be distributed in a circumferential direction on the surface of the upper or lower side, wherein areas without means are arranged between these partial areas.

For a mutual holding between the hub ring and the structural component part, e.g., the cover plate, the hub ring can have at least one bore hole for receiving connection rivets which extends in axial direction through the hub ring. In the hub ring, according to the present invention, the connection rivet positions and secures the connection between the hub ring and cover plate as well as absorbs axial loads such as the axial force component of the serration, for example. However, the connection rivet does not cause a transmit of torque between these two component parts. Therefore, a small quantity of bore holes in the hub ring, e.g., four bore holes, is sufficient. Further, the rivets used for positioning can have a smaller diameter than rivets used in known clutch disks for the transmission of torque. Therefore, bore holes of 6 mm are sufficient for receiving the rivets in the hub ring according to the invention. Therefore, such small dimensioning of the bore hole causes only a slight weakening of the hub ring and allows a flexible design of the hub ring adapted to the actual use of the hub ring.

Since, the hub ring, according to the present invention, is not weakened by a large number of bore holes of relatively large diameter, it is possible to produce the hub ring from a material of lower strength. Thus, the hub ring may be manufactured by sintering, for example. Advantageously, this yields a great savings in production costs compared to forged pieces which must be machined by cutting.

The hub ring, according to the present invention, may include at least two segments, such as a ring that includes two ring halves, which is advantageous with respect to production and assembly of the clutch disk. However, these advantages can only be achieved with a hub ring, according to the present invention, in which means for positive engagement with the cover plate are provided at the surface of the upper or lower side, and the transfer of torque is carried out only in this way. The positive engagement prevents rotation of the individual segments. This advantage can also be important in one-piece hub rings. The operation of the hub ring is not influenced in the event that the hub ring breaks during the operation of the clutch disk, for example.

The invention is also directed to a cover plate for a clutch disk, which has means for corner plate a positive engagement for transmission of torque with a hub ring at least partially on the inside in an annular area. The side of the cover plate facing the hub ring when installed is referred to as the underside of the cover plate. Also, in this cover plate according to the present invention, some of the above-mentioned advantages are noticeable. Accordingly, a large number of large bore holes in the cover plate for rivets for transmitting torque may be dispensed with by providing means for positive engagement at the underside of the cover plate. Therefore, the cover plate is not weakened by the bore holes, but rather is strengthened in the area where torque is transmitted particularly when the means for positive engagement are in the form of a toothing.

The annular area in which the means for positive engagement are arranged on the inside of the cover plate corresponds to the shape of the respective upper or lower side of a hub ring. Depending on the distribution of the means on the hub ring, this area is provided either completely or only partially with means for positive engagement, wherein the partial areas in which means are provided and the type of means correspond to the means provided on the hub ring.

The invention is also directed to a clutch disk with a torsional vibration damper, which has a hub ring arranged on a hub with play via a toothing and a cover plate which is arranged coaxially on both sides for receiving the torsional vibration damper. The connection between the hub ring and the cover plates for transmitting torque is made through a positive engagement via means which are provided in at least a partial area of the respective upper or lower side of the hub ring and on the undersides of the cover plates. These means preferably comprise a toothing. Further, means for the mutual holding of the hub ring and cover plate may be provided in the clutch disk, the latter including at least one bore hole for receiving a rivet in the hub ring and the cover plates.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
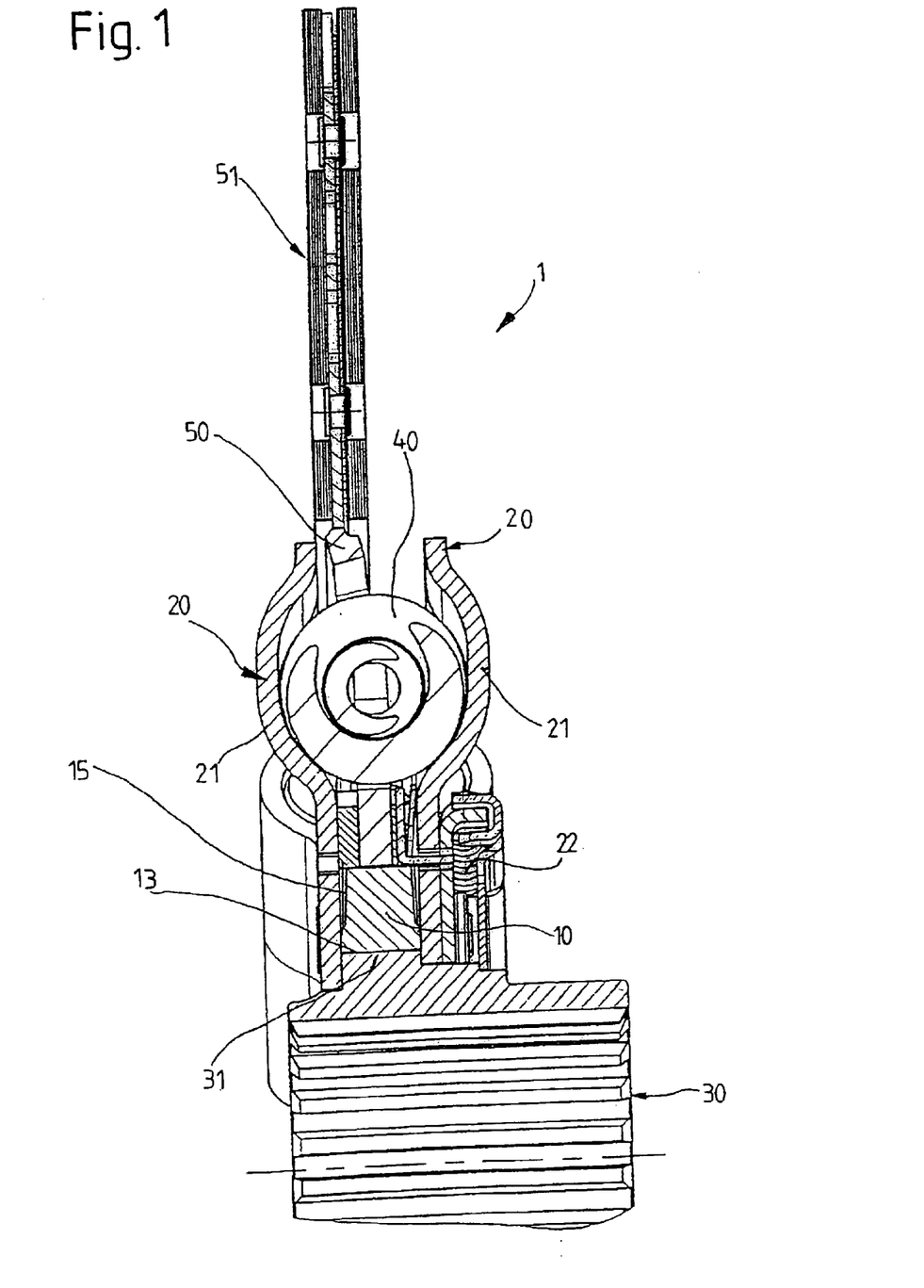
FIG. 1 is a partial cross-sectional view of a clutch disk according to the present invention.

FIG. 1 is a partial cross-section view of a clutch disk 1 according to the present invention.

A hub 30 is connected to the transmission rod (not shown) so as to be fixed with respect to rotation relative to it. The hub 30 has an external toothing 31 at its outer side. The hub 30 engages with an internal toothing 13 of a hub ring 10 by means of external toothing 31. Herein, the hub ring 10 will be described in more detail below with reference to FIGS. 2 to 6.

Two cover plates 20 are provided coaxial to the hub ring 10 on both sides. The cover plates 20 engage with the hub ring 10 via a Hirth serration 15 which is provided at the front sides of the hub ring 10 and the respective underside of the cover plate 20.

Further, pressure springs 40 making up the torsional vibration damper are held in the clutch disk 1. These pressure springs 40 are held between the receiving means 21, which are provided in the cover plates 20. Edges of windows in the driven disk 50, act on the axial ends of the pressure springs 40. Hollow spaces to receive means for predamping are provided below the bottom cover plate 20. Such means are indicated in the present embodiment as a spiral spring 22. Driven disk 50 is connected to a ring covered with a friction lining on both sides i.e. the ring 51.

The clutch disk 1 according to the present invention may be used in the following manner. Engine torque is transmitted to the ring 51 from the engine via the engine flywheel and the pressure plate (neither shown for clarity). This engine torque is transmitted to the driven disk 50 connected to the ring 51. The driven disk 50 in turn contacts the pressure springs 40 arranged in windows of the driven disk 50 and transmits the torque by means of the springs 40 over the spring force resistance to the cover plate 20 where the pressure springs 40 are held. In turn, the torque is transmitted to the hub ring 10 via the cover plate 20 using the Hirth serration 15 at the lower side of the cover plate 20 and the upper side of the hub ring 10. The torque transmitted in this way to the hub ring 10 can finally be transmitted via the internal toothing 13 of the hub ring 10 and the external toothing 31 of the hub 30 to the hub 30 and, therefore, the transmission shaft (not shown) which is connected to the latter so as to be fixed with respect to rotation relative to it. In this connection, a certain play is provided between the internal toothing 13 of the hub ring 10 and the external toothing 31 of the hub 30. This play determines the effective area of the predamping, particularly the predamping angle.

Figure 2:
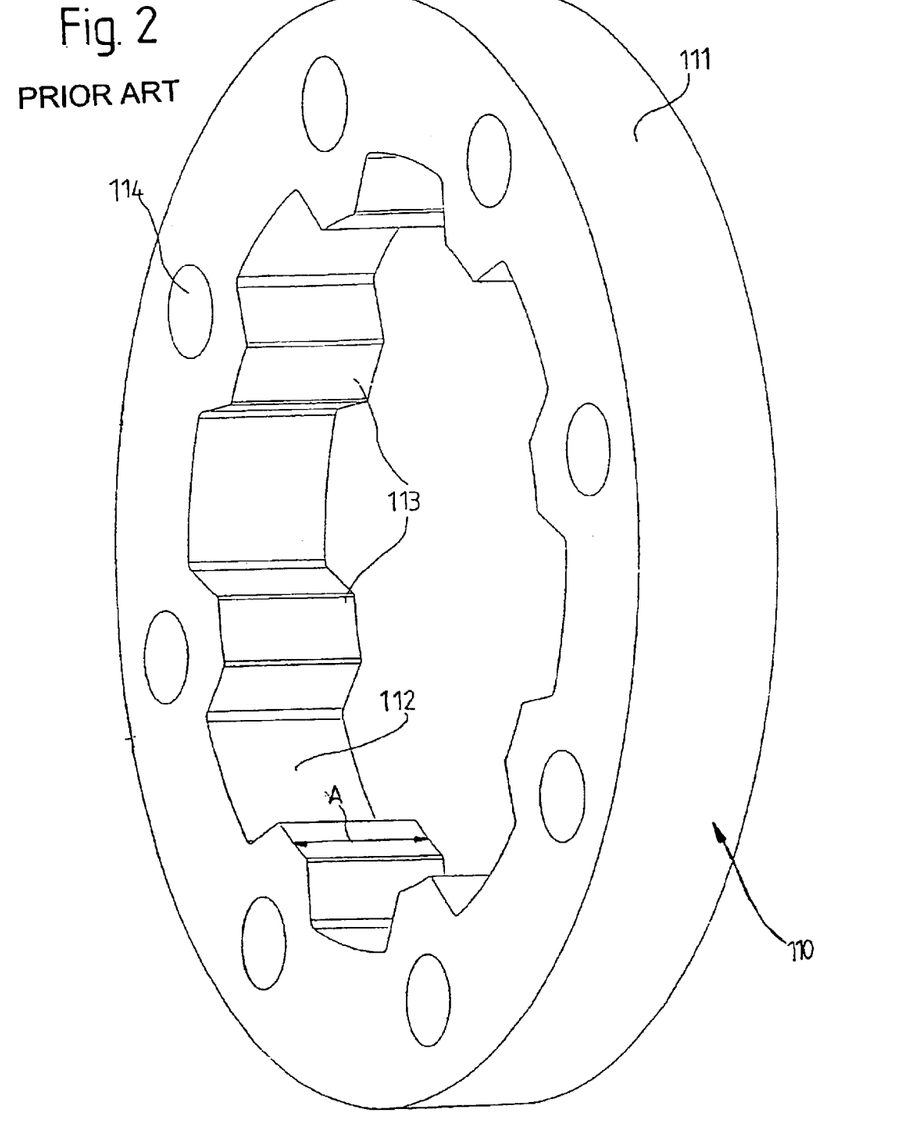
FIG. 2 is a perspective view of a hub ring known in the art.

FIG. 2 is a perspective view of a hub ring known in the art. The hub ring 110 has a circular outer circumference 111 and has a toothing 113 directed toward the center of the hub ring 110 at the interior circumference 112. Toothing 113 brings the hub ring 110 into engagement with a hub which is connected to a transmission shaft (not shown) so as to be fixed with respect to rotation relative to it. In the hub ring 110 shown in the drawing, the toothing 113 has eight teeth. Further, eight bore holes 114 which serve to receive rivets are provided in the hub ring 110. The bore holes 114 are distributed circumferentially along of the hub ring and extend in axial direction A through the hub ring 110. The individual teeth of the toothing 113 not only engage with a hub 130, but also enlarge the hub ring 110 where the bore holes 114 are provided. These enlargements or reinforcements of the hub ring 110 are necessary, because the bore holes 114 have a diameter that is large in relation to the distance between the inner radius 112 and the outer circumference 111, that is, the width of hub ring 110. The bore holes 114 are known to have a diameter of 9 mm, for example, which the width of the hub ring 110 was only 15 mm.

Figure 3:
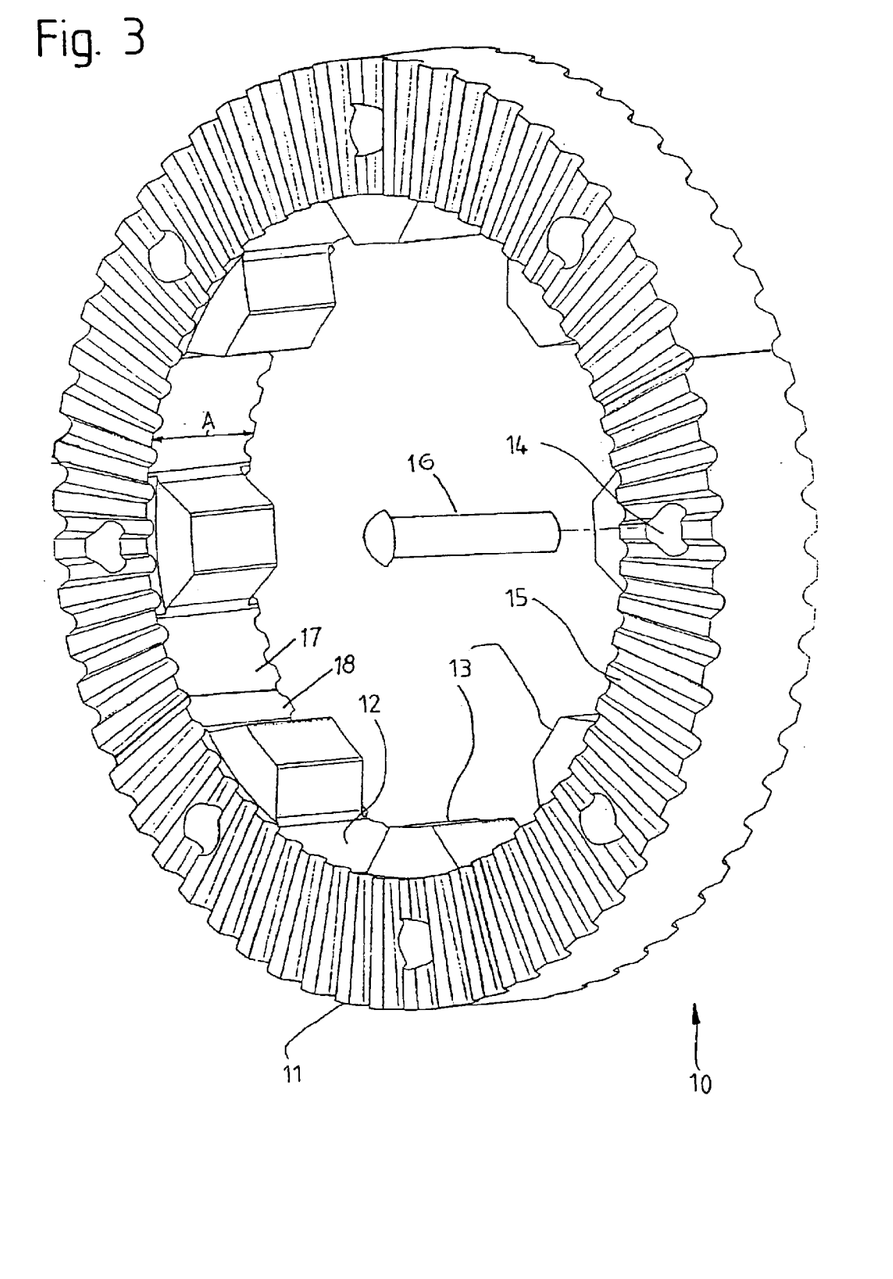
FIG. 3 is a perspective view of a first embodiment form of a hub ring according to the present invention.

FIG. 3 is a perspective view of one embodiment of a hub ring 10 according to the present invention. Hub ring 10 likewise has a circular outer circumference 11 and an inner radius 12. In this embodiment form, there are also eight teeth at the inner radius 12. Eight bore holes 14 which receive rivets 16 extend in axial direction A through the hub ring 10 and are spatially matched to the teeth in the hub ring 10. However, the bore holes 14 may also be at other points. Therein, the possibility of freely distributing the bore holes 14 in the circumferential direction of the hub ring 10 results from the fact that the diameter of these bore holes 14 is substantially smaller compared to those used in a typical hub ring. Herein, bore holes as small as 6 mm may be provided. A toothing 15 is provided at the upper side and underside of the hub ring 10, that is, at its front sides, at the respective surface. In the embodiment depicted in FIG. 3, toothings 15 are oriented in such a way that each of the teeth of the toothing 15 extends from the exterior 11 of the hub ring 10 to its interior radius 12 over the entire width of the ring 10 and wherein the extension of each of the teeth faces into the center of the hub ring 10, that is, in the axis of rotation. FIG. 3 also illustrates how the hub ring 10 may be made of a first segment 17 and a second segment 18.

Figure 4:
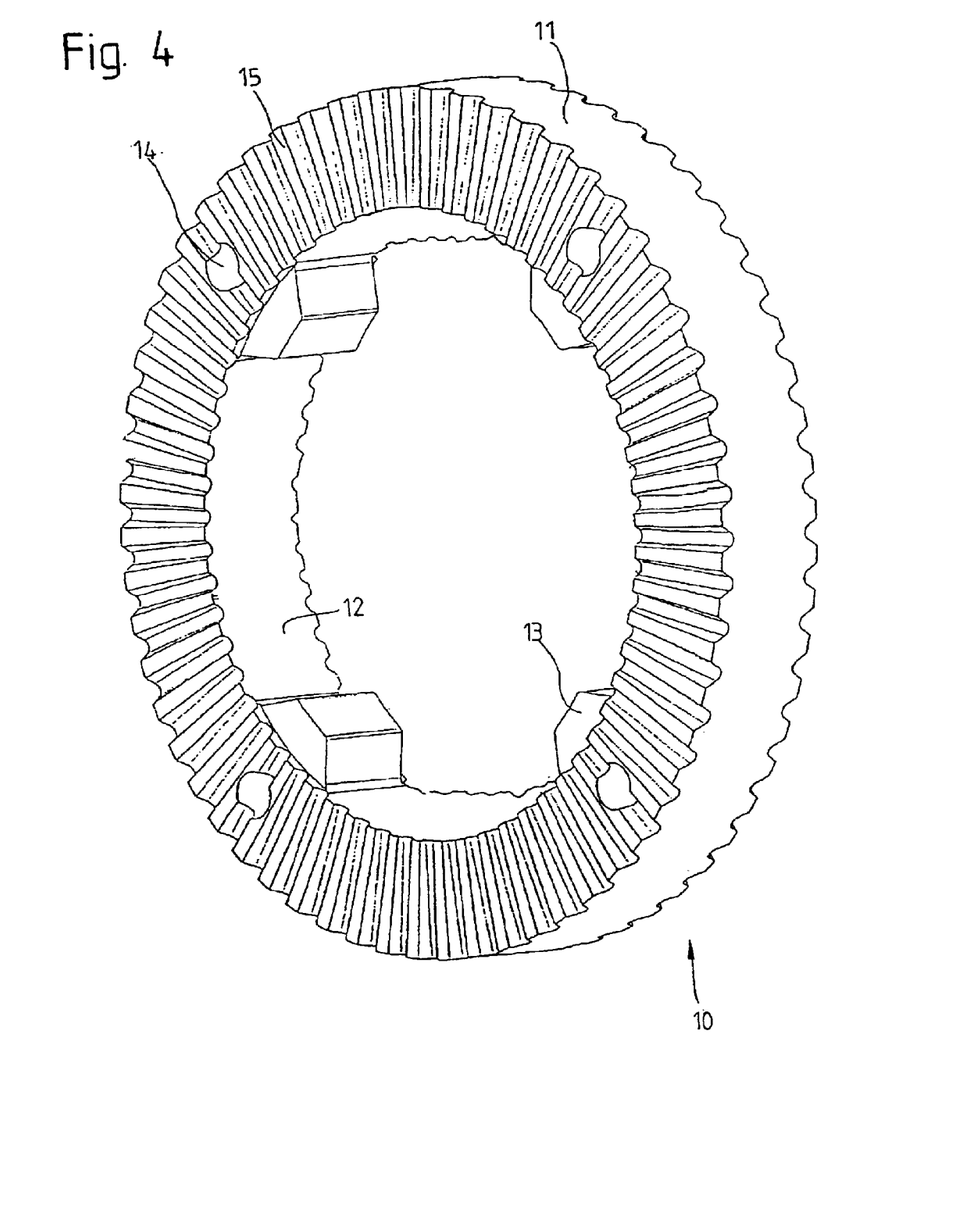
FIG. 4 is a perspective view of another embodiment form of a hub ring according to the present invention, with four bore holes.

FIG. 4 is a perspective view of another embodiment of the hub ring 10 according to the present invention. This hub ring 10 is similar to the hub ring 110 depicted in FIG. 2, but has only four bore holes 14 for receiving rivets and only four teeth at the interior 12.

The teeth shown in FIGS. 3 and 4 are so-called Hirth serrations. In this respect, all geometric lines are formed in a wedge-shaped manner. The height of the teeth decreases from the exterior 11 to the inner circumference 12, resulting in a conical cross-section of the hub ring 10. Apart from the savings in space, the advantage of this type of toothing 15 is that it is self-centering. However, it is also within the scope of the invention to use a conventional toothing 15 with unvarying tooth height.

Figure 5:
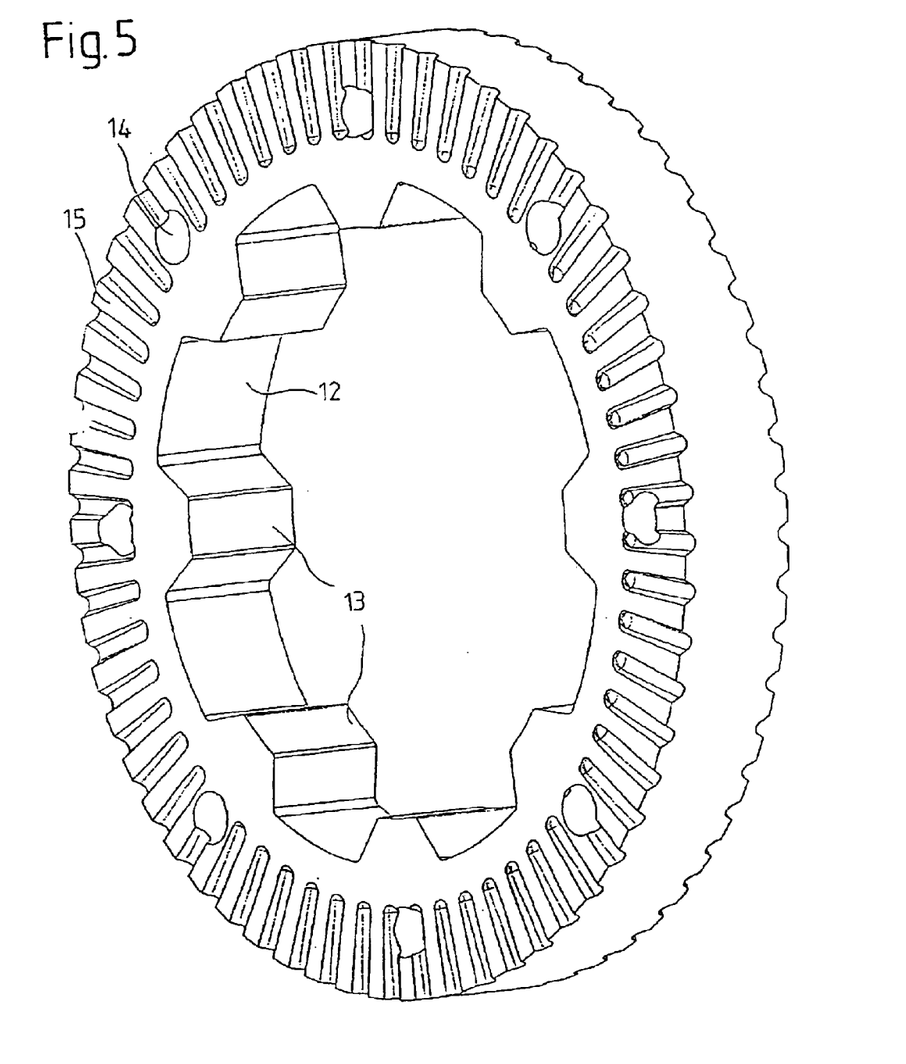
FIG. 5 is a perspective view of a further embodiment form of a hub ring according to the present invention.

FIG. 5 is a perspective view of a further embodiment of the hub ring 10 according to the present invention. In this hub ring 10, a toothing 15 is provided at the front sides in each instance, this toothing 15 extending from the outer circumference 11 in direction of the inner radius 12, but only over an area 10*a* that is half of the width of the hub ring 10. Accordingly, toothing 15 is not provided on an inner area 10*b* of the upper and lower surfaces of the hub ring 10.

Figure 6:
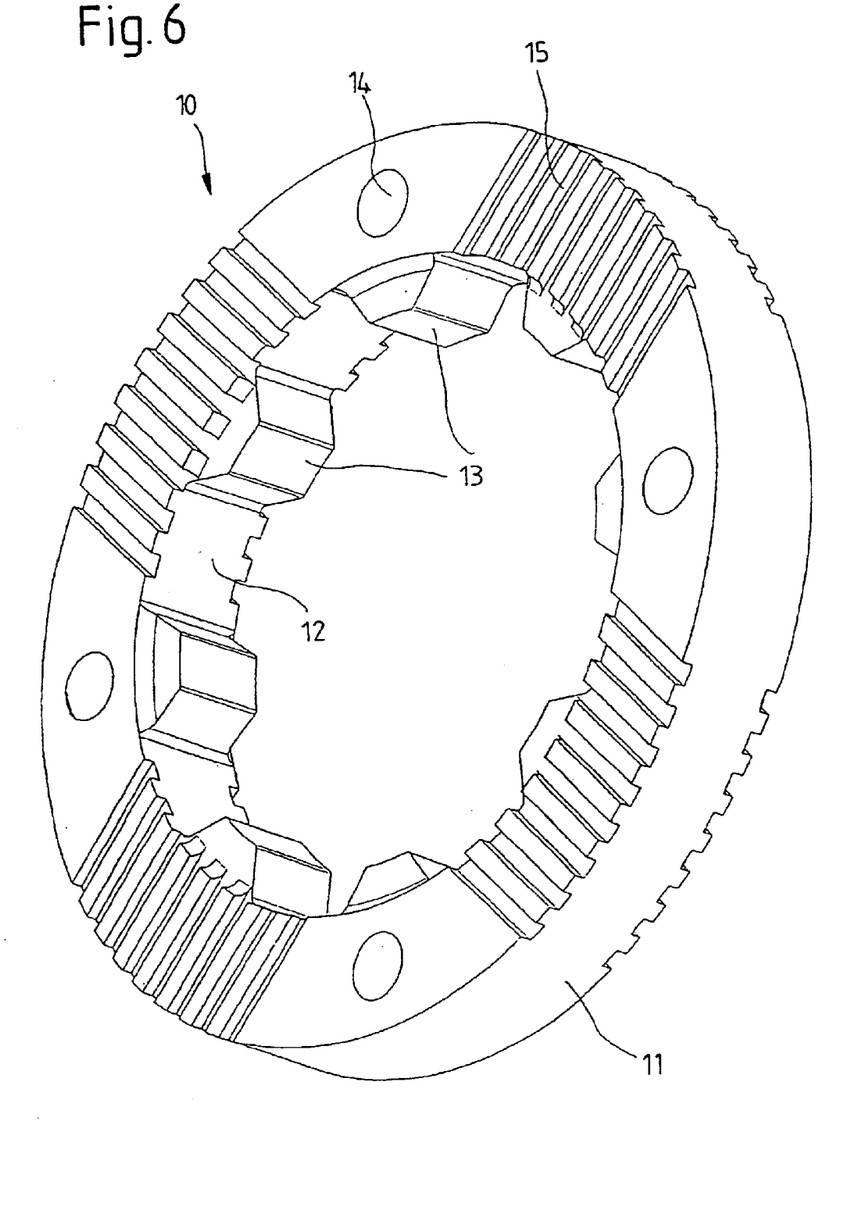
FIG. 6 is a perspective view of a further form of a hub ring according to the present invention.

FIG. 6 is a perspective of a yet further embodiment of the hub ring 10 according to the present invention. In this embodiment, the toothing 15 is provided only in partial areas 10*c* of the upper side and lower side of the hub ring 10. Between this partial area 10*c* are partial areas 10*d* in which no toothing 15 is provided at the surface. Bore holes 14 that receive connection rivets 16 are introduced through the hub ring 10 in these free partial areas 10*d*. The toothing 15 shown in FIG. 6 is not a serration, but a conventional toothing in which the teeth are oriented parallel to one another and the height of the teeth does not change along the length. However, in an embodiment of this type, the toothing 15 may also be a serration in partial areas. In the present embodiment, eight teeth 13 are provided at the inner side 12 of the hub ring 10.

Figure 7:
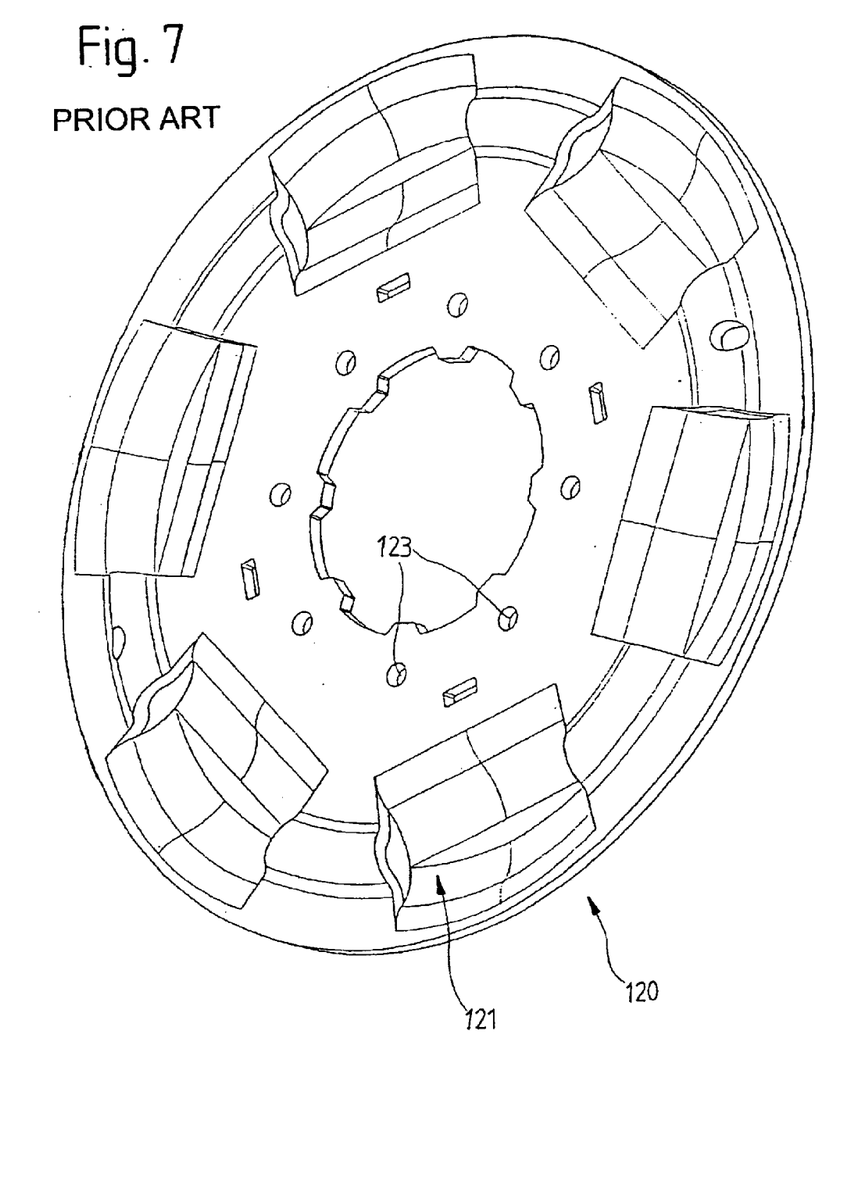
FIG. 7 is a perspective view of a cover plate known in the art.

FIG. 7 is a perspective of a cover plate 120 known in the art. Receiving depressions 121 for pressure springs of a torsional vibration damper are provided in the cover plate 120. These receiving depressions 121 are distributed over the circumference in the outer area of the cover plate. In the inner area of the cover plate 120, bore holes 123 are provided for receiving connection rivets by means of which the cover plate 120 can be connected to a hub ring and by means of which the torque can be transmitted from the cover plate to the hub ring.

Figure 8:
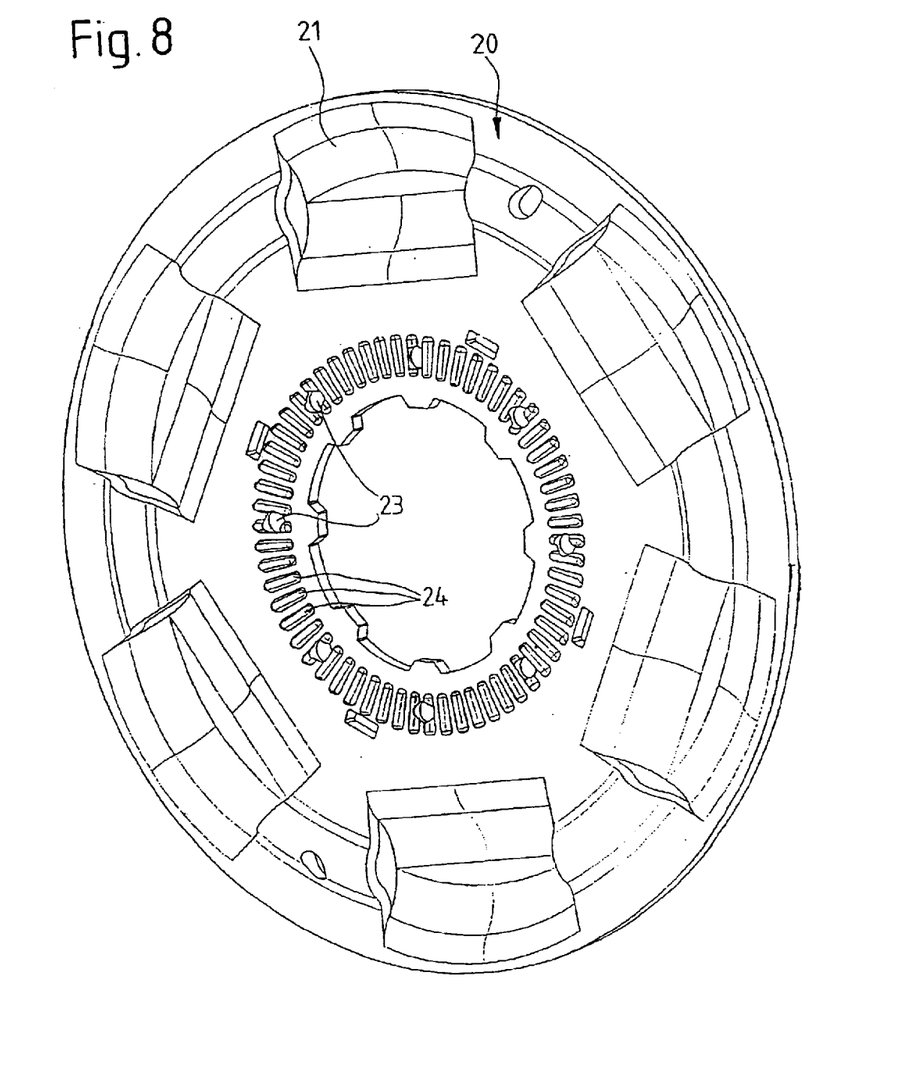
FIG. 8 is a perspective view of a first embodiment form of a cover plate according to the present invention.

FIG. 8 is a perspective view of an embodiment of the cover plate 20 according to the present invention. This cover plate 20 is similar to cover plate 120 shown in FIG. 7. However, a toothing 24 is provided on the lower side of the cover plate 20. This toothing 24 is provided in an area of the cover plate 20 which is located in the vicinity of the inner circumference of the cover plate. This area has bore holes 23 and matches the shape and size of the front side of the hub ring 10 on which the cover plate 20 is arranged.

The toothing 24 on the underside of the cover plate 20 cooperates with the toothing 15 which is arranged on the front sides of the hub ring 10. Thus, positive engagement may be achieved between the hub ring 10 and cover plate 20 for transmitting torque. When the toothing 15 is arranged on the hub ring 10 only in partial areas 10c of the upper side and lower side, the toothing 24 is likewise provided at the underside of the cover plate 20 only in matching partial areas. The toothing 24 can be applied on the lower side of the cover plate 20 or can be stamped into the cover plate 20.

A clutch disk in which the transmission of torque from the hub to the cover plate can be carried out without large loads occurring at individual structural component parts which can result in a shearing off of the structural component parts, e.g., rivets, is provided is by the present invention in a simple but reliable manner. Further, the clutch disk according to the present invention and the hub ring according to the present invention offer the advantage that the latter can be designed in a flexible manner and particularly with respect to the size of the predamping angle the loads can be designed in a corresponding manner. Due to this flexibility in the selection of the distance between the teeth of the internal toothing of the hub ring, greater predamping angles of 15°, for example, can be achieved. Larger predamping angles permit additional design possibilities in a predamper system. For example, a two-stage predamping system is possible in which either two springs with different spring force or a spring device and a friction device can be used. As a whole, a greater torque can be transmitted to the hub with the hub ring of the present invention, while also the hub ring can be produced from a less expensive material or by more economical production methods.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hub ring for use in a clutch disk, the hub ring comprising:
   an inner circumference which can engage a hub; and
   a pair of axially opposed front sides, each of the front sides having means for positively engaging a structural component arranged against the front side so that torque can be transmitted from the structural component to the hub.

2. The hub ring of claim 1, wherein the structural component comprises a cover plate.

3. The hub ring of claim 1, wherein the means for positively engaging a structural component comprise a toothing.

4. The hub ring of claim 1, wherein the means for positively engaging a structural component are disposed on all of each of the front sides.

5. The hub ring of claim 1 the hub ring further comprising an outer circumference and a first area of the at least one of the front sides, the first area extending between the outer circumference and the inner circumference, and wherein the means for positively engaging a structural component are disposed in the first area.

6. The hub ring for a clutch disk of claim 1 the hub ring further comprising an outer circumference, and wherein the at least one of the front sides comprise a plurality of areas, each area extending from the outer circumference to the inner circumference and each of the plural areas being adjacent to another one of the plural areas, the means for positively engaging a structural component being disposed so that the means for positively engaging a structural component is disposed in one of the plural areas but not in the other ones of the plural areas.

7. The hub ring for a clutch disk of claim 1, wherein the hub ring comprises sintered material.

8. A clutch disk comprising:
   a hub;
   a hub ring having an inner circumference which engages the hub with play and a pair of axially opposed front sides;
   a pair of cover plates having a respective pair of axially opposed undersides which are arranged coaxially against respective said axially opposed front sides of the hub ring, wherein the undersides and the front sides have means for positively engaging each other so that torque can be transmitted from the cover plate to the hub ring;
   means for securing the hub ring and at least one of the cover plates to each other, said means comprising at least one rivet received in the hub ring and the respective at least one of the cover plates; and
   at least one torsional vibration damper received between the cover plates.

9. The clutch disk of claim 8, wherein the means for positively engaging one of the front sides of the hub ring and at least one of the respective one of the undersides of the pair of cover plates comprise toothings.

10. The clutch disk of claim 8, wherein the hub ring comprises an outer circumference and a first area of the respective one of the front sides in positive engagement with the respective of one of the cover plate, the first area extending between the inner and outer circumference and the means for positively engaging the respective one of the cover plates disposed in the first area.

11. The clutch disk of claim 8, wherein the hub ring further comprises an outer circumference, and wherein the at least one of the front sides comprise a plurality of areas, each area extending from the outer circumference to the inner circumference and each of the plural areas being adjacent to another one of the plural areas, the means for positively engaging the respective one of the cover plates being disposed so that the means for positively engaging the respective one of the cover plates is disposed in one of the plural areas but not in the other ones of the plural areas.

12. The clutch disk of claim 8, wherein one of the respective pair of undersides of the pair of cover plates comprises an annular area, the means for positively engaging the hub ring being disposed on the annular area.

13. The clutch disk of claim 12, wherein the annular area in an area of the means for positively engaging the hub ring is formed to match a front side of the hub ring.

14. The clutch disk of claim 8, wherein the hub ring comprises sintered material.

15. A hub ring for use in a clutch disk, the hub ring comprising:

an inner circumference which can engage a hub;

a pair of axially opposed front sides, at least one of the front sides having means for positively engaging a structural component arranged against the at least of one the front sides so that torque can be transmitted from the structural component to the hub; and a bore hole and a connection rivet, the bore hole for receiving the connection rivet and the connection rivet for connecting the hub ring with the structural component.

16. The hub ring of claim 15, wherein the structural component comprises a cover plate.

17. The hub ring of claim 15 the hub ring further comprising an outer circumference and a first area of the at least one of the front sides, the first area extending between the outer circumference and the inner circumference, and wherein the means for positively engaging a structural component are disposed in the first area.

18. The hub ring for a clutch disk of claim 15 the hub ring further comprising an outer circumference, and wherein the at least one of the front sides comprise a plurality of areas, each area extending from the outer circumference to the inner circumference and each of the plural areas being adjacent to another one of the plural areas, the means for positively engaging a structural component being disposed so that the means for positively engaging a structural component is disposed in one of the plural areas but not in the other ones of the plural areas.

19. The hub ring for a clutch disk of claim 15, wherein the hub ring comprises four bore holes.

20. A hub ring for use in a clutch disk, the hub ring comprising:

first and second segments separable from each other so that when joined the first and second segments form the hub ring;

an inner circumference which can engage a hub; and a pair of axially opposed front sides, at least one of the front sides having means for positively engaging a structural component arranged against the at least of one the front sides so that torque can be transmitted from the structural component to the hub.

21. The hub ring of claim 20, wherein the structural component comprises a cover plate.

22. The hub ring of claim 20 the hub ring further comprising an outer circumference and a first area of the at least one of the front sides, the first area extending between the outer circumference and the inner circumference, and wherein the means for positively engaging a structural component are disposed in the first area.

23. The hub ring for a clutch disk of claim 20 the hub ring further comprising an outer circumference, and wherein the at least one of the front sides comprise a plurality of areas, each area extending from the outer circumference to the inner circumference and each of the plural areas being adjacent to another one of the plural areas, the means for positively engaging a structural component being disposed so that the means for positively engaging a structural component is disposed in one of the plural areas but not in the other ones of the plural areas.

24. The hub ring for a clutch disk of claim 20, wherein the hub ring comprises sintered material.

* * * * *